United States Patent
Jaroschek et al.

[11] Patent Number: 5,747,076
[45] Date of Patent: May 5, 1998

[54] ELECTRIC DRIVE WITH HYDRAULIC ASSIST IN AN INJECTION MOLDING MACHINE

[75] Inventors: Christoph Jaroschek, Endingen; Karl-Heinz Bourdon, Reute, both of Germany

[73] Assignee: Ferromatik Milacron Maschinenbau GmbH, Malterdingen, Germany

[21] Appl. No.: 706,030

[22] Filed: Aug. 30, 1996

[30] Foreign Application Priority Data

Sep. 1, 1995 [DE] Germany .............. 195 32 267.3

[51] Int. Cl.⁶ .................................................. B29C 45/77
[52] U.S. Cl. ..................... 425/145; 264/40.3; 425/149
[58] Field of Search ............................. 425/145, 149; 264/40.3

[56] References Cited

U.S. PATENT DOCUMENTS 5,338,174  8/1994  Miese et al. ..................... 425/150
5,514,311  5/1996  Shimizu et al. ................... 425/145
5,540,495  7/1996  Pickel ............................... 425/145

FOREIGN PATENT DOCUMENTS 4344335  12/1993  Germany.

*Primary Examiner*—Tim Heitbrink
*Attorney, Agent, or Firm*—Stephen H. Friskney

[57] ABSTRACT

An electric drive with hydraulic assist is disclosed for use in an injection molding machine, especially for screw advance during the injection process and/or in the dwell pressure phase. An electric motor is primarily used to produce the axial advance of the injection screw via an appropriate gear train. A piston that is moveable in a cylinder through pressure provided by a hydraulic fluid reservoir, can be used to supplement the axial movement produced by the electric motor. It is proposed according to the invention that pressurization occurs via the hydraulic fluid reservoir upon reaching a defined control quantity which corresponds to a defined load condition on the electric motor, such that the pressure rise in the cylinder is proportional to the load on the electric motor.

10 Claims, 1 Drawing Sheet

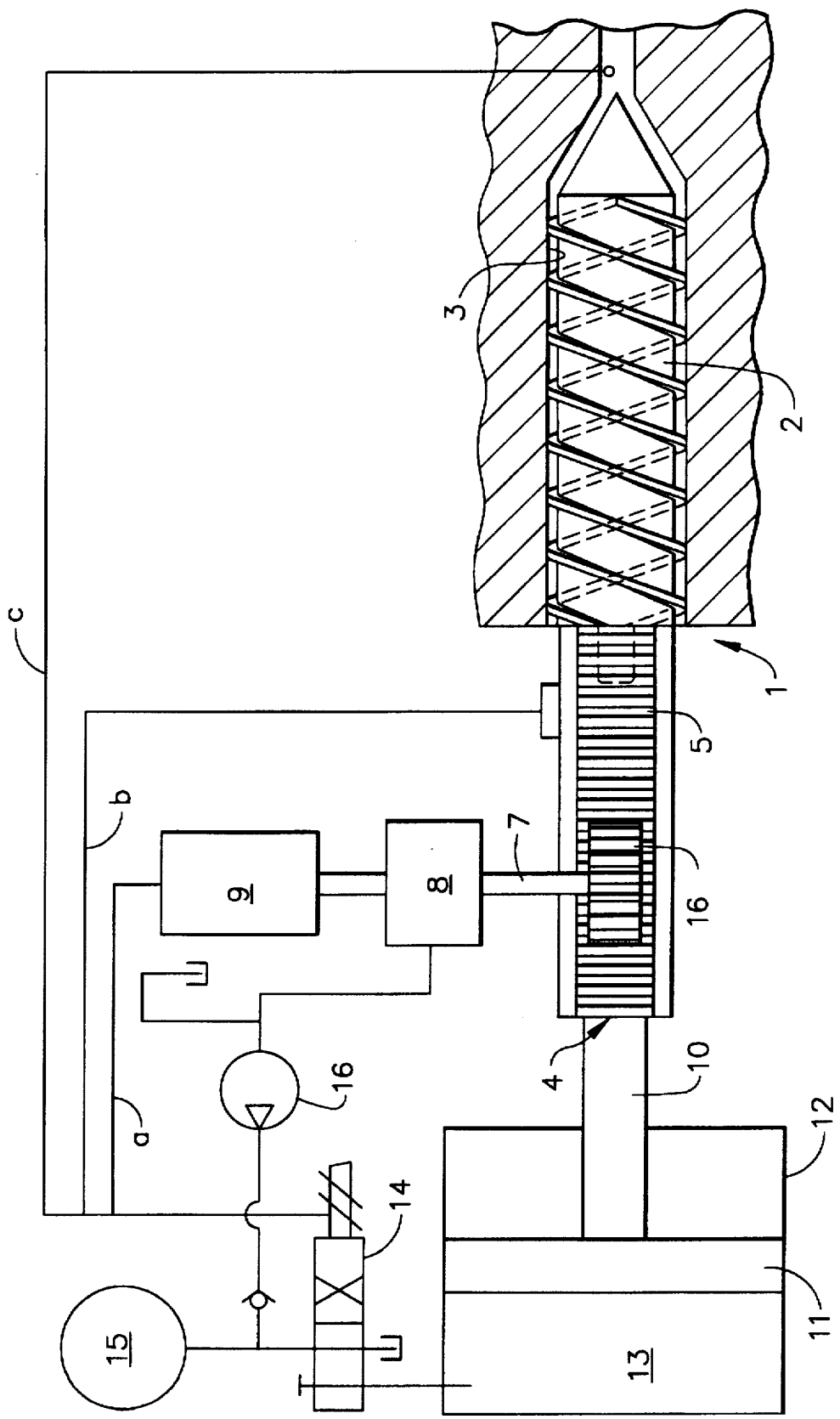

5,747,076

1

ELECTRIC DRIVE WITH HYDRAULIC ASSIST IN AN INJECTION MOLDING MACHINE

BACKGROUND OF THE INVENTION

1. Field of Invention

The invention concerns an electric drive with hydraulic assist in an injection molding machine, more specifically, an electromechanical drive with hydraulic assist for screw advance during the injection process.

2. Description of the Related Art

An injection unit in an electrically driven injection molding machine generally operates according to the following scheme: the injection screw has two electric drive systems and is housed to rotate and move axially in the melting cylinder. One drive system causes rotational movement of the screw and the other drive causes translational movement of the screw in the melting cylinder. At the beginning of the cycle, the tip of the plastifying and injection screw is situated in the region of the nozzle orifice of the melting cylinder. In preparation for the injection process, the screw is rotated to convey plastified material in front of the screw tip. Concurrently, the screw begins to move away from the nozzle opening by the force of the accumulating material until the desired quantity of melt is transported in front of the screw tip. The electric drive system for translatory movement of the screw is subsequently engaged, during which time the screw now serves as injection piston that forces the plastified material from the melting cylinder, through the nozzle orifice and into the mold cavity.

This type of injection molding unit is known, for example, from DE-OS 43 44 335. Conversion of the rotational movement of the electric motor to a translation movement of the screw occurs there via a spindle that is provided with an internal cylinder having a piston connected to the drive journal. During dynamic loading of the screw, hydraulic oil can be drained into the tank from the internal cylinder via a line passing through the piston and the drive journal by means of a pressure proportional valve to a hydraulic tank. Thus, the desired dynamic pressure can be ensured by means of the pressure proportional valve. The hydraulic fluid in this internal cylinder thus serves merely as a buffer element that is supposed to guarantee that the dynamic pressure remains roughly constant.

However, a drawback in this prior art system is that at increased load, for example, during the dwell pressure phase or even during the primary injection operation, the electric motor used to produce the translatory movement of the screw is also exposed to high loads. As long as the power of the electric motor, such as a servomotor, is sufficient for translatory movement and for the dwell pressure phase, the machine drives the hydraulically coupled injection screw with good efficiency. Only at higher conveyed loads does the overall efficiency of the machine drop.

SUMMARY OF THE INVENTION

The objective of the present invention is therefore to configure a drive system for an electrically driven injection molding machine that avoids overloading the drive motor, while the efficiency of the machine remains roughly constant.

In particular, the invention concerns an electric drive with hydraulic assist in an injection molding machine, especially for screw advance and/or in the pressure dwell phase during the injection process. An electric motor produces the axial

2 advance movement through an appropriate gear train, while a piston moveable in a cylinder and pressurizable from a hydraulic fluid reservoir, can be used to supplement the axial movement produced by the electric motor.

In contrast to the drive known from DE-OS 43 44 335, hydraulic assist according to the invention is not a passive, reacting device, but rather actively assists the electric motor for the translatory movement as a function of certain load conditions. Hydraulic power assist of an electric drive is therefore involved. For this purpose the spindle or rack that serves as transmission element of the rotary movement of the electric motor to a translatory movement of the screw is coupled at one end with a hydraulic cylinder, as is known from DE-OS 43 44 335. This hydraulic cylinder is coupled via controllable hydraulic valves to a hydraulic fluid reservoir, also called a hydraulic accumulator.

Engagement of the hydraulic force occurs as a function of the load of the electric motor. For example, higher forces are required for higher speeds on the injection axis of an injection molding machine in order to inject an amount of plastic melt at a rate consistent with the rheological properties of the melt. The corresponding load of the driving electric motor thus necessarily increases. On reaching a defined load, as indicated either by torque measurement or measurement of power consumption, hydraulic force is implemented, i.e., hydraulic pressure is supplied to the cylinder in front of the working piston. The pressure rise in the cylinder is proportional to the load on the drive motor.

Connection of the hydraulic power assist may be necessary during the injection process, at which time the electric motor can be overloaded in an effort to maintain the desired injection speed without the hydraulic assist. In this case the feedback signal to control the hydraulic circuit can be the actual speed, which is compared with a preset reference speed. When the actual speed is less than the reference speed, i.e., when the motor does not have sufficient power to achieve the reference speed, the injection process is hydraulically assisted.

Alternatively, connection of hydraulic force can occur in the pressure dwell phase. Due to the fact that the cavity of the mold is already filled during the injection process and shrinkage effects of the molded article from the dwell pressure must be equalized in the cavity, high pressure forces are required in this portion of the injection process. These forces must be counteracted in order to keep the screw from moving backward. In this situation, as with direct injection, the electric motor can reach its upper power limit. In addition to the possibility of direct measurement of the power of the electric motor, the actual pressure is measured in the melt and compared with a reference dwell pressure. If the actual pressure falls below the reference pressure, this is an indication that the electric motor has reached or surpassed its power limit. The hydraulic power assist is implemented accordingly.

In addition to direct melt pressure measurement, a force measurement on the end of the screw shaft can be used to produce a feedback signal, during which can be compared to maximum force that corresponds with a specific (harmful) load condition of the motor.

Thus, the efficiency of the injection molding machine is kept at a constantly high level with protection of the electric motor, which not only serves for quality assurance, but also guarantees that the machine, especially the drive, is not subjected to damage from overload conditions.

According to another advantageous feature of the invention, the hydraulic fluid reservoir can be charged with a pump driven by the electric motor. A coupling system is provided by which the electric motor can be connected alternately to the pump to charge the reservoir or the gear train for translatory movement of the screw. This means that during the plastification phase, when the drive only rotates the screw so that it is pushed backward (by the plastic melt accumulating in front of the screw tip), pressure in the hydraulic cylinder is not required. Accordingly, during this period, the electric motor can be disconnected from the translation drive and coupled to the pump. The pump charges the reservoir with the hydraulic oil present in the circuit, so that a pressure of about 160 bar is reached. The amount of oil in circulation for this system, in comparison with prior art machines driven purely hydraulically, is relatively small so that environmental problems are negligible.

Although the invention is described in the context of an injection molding process involving injection of thermoplastic melt into the cavity of a mold, the invention is not necessarily limited to this application. It is conceivable that this type of hydraulically assisted electric drive can also be used on the closure (clamp) side of the injection molding machine, or to maintain the nozzle contact force during the injection process.

BRIEF DESCRIPTION OF THE DRAWINGS

The only figure shows a diagrammatic view of the injection device of an injection-molding machine.

DESCRIPTION OF THE PREFERRED EMBODIMENTS

The invention is presented and further explained below with reference to a drawing. The only figure shows a diagrammatic view of the injection device of an injection molding machine, which in general is given the reference number 1. It consists essentially of a melting and injection screw 2, which is installed to rotate and be moved axially in a melting cylinder 3. The rotary drive for screw 2 is not shown.

The screw 2 is mounted to rotate relative to a drive element that acts in translatory fashion at 4. This translatory drive element in the present case is a rack 5. The teeth of a pinion 6 mesh with the teeth of rack 5. The pinion 6 is mounted on a shaft 7 that is driven by an electric motor 9 via a coupling element 8. The rod 10 of a piston 11 is attached at its free end in alignment with the rack 5. Piston 11 is configured for movement within a hydraulic cylinder 12. The cylinder space 13 facing away from the piston rod can be connected to a hydraulic fluid accumulator or reservoir 15 by a distributing valve 14.

In addition, the electric motor 9 can be used to drive a hydraulic pump 16 that charges the hydraulic fluid reservoir 15 via coupling 8, when the motor is disconnected from pinion 6.

Alternative control possibilities are shown with the letters a, b and c, which control distributing valve 14 and, when necessary, cause it to operate so that the cylinder space 13 is either connected to reservoir 15 or separated from it.

The letter a denotes the control strategy involving a signal generated by measuring the torque or power of the electric motor 9, thereby indicating when an overload of the electric motor 9 occurs. The distributing valve 14 is then operated to enter the switching position in which the reservoir 15 is connected to the cylinder space 13. The hydraulic drive of the piston 11 then assists the electric drive through the rack 5, for example, during forward movement (injection movement) of the screw 2. This support can also occur when the screw 2 has already injected the required amount of plastic and must now consolidate a limited amount of additional material in the dwell pressure phase.

In the case of alternative b, the actual speed during screw advance is measured by means of a path-time measurement and compared in an electronic device (not shown) with the desired reference speed. If the actual speed falls short of the reference speed, this is an indication of overload of electric motor 9. Accordingly, a signal is produced that acts on distributing valve 14 so that it connects the reservoir 15 to cylinder space 13, in which case hydraulic power assist is connected to advance the screw 2, as described above.

A third alternative is denoted with the letter c. Here the melt pressure of the thermoplastic material is measured in the region of the nozzle orifice in front of the screw 3. This actual pressure value is compared with a preset reference value. If the actual pressure is less than the reference value, the distributing valve 14 is activated to connect the cylinder space 13 to reservoir 15. Alternatively, instead of the melt pressure, the force acting at 4 can be measured during the dwell phase so that a signal is similarly produced to connect the hydraulic drive, as required.

Electric motor 9 is connected to pump 16 via coupling 8 when the plastification process is in process. During this part of the process, the screw 2 only requires a drive for rotational movement, so that the plastified material is transported in front of the screw tip and the screw 2 is moved backward by the cushion of accumulating plastic melt. Since translational movement is not required at this time, the motor 9 can be used to drive the pump 16 via the coupling 8, thereby charging the reservoir 15 with hydraulic fluid.

What is claimed is:

1. An electric drive with hydraulic assist for moving a melting and injection screw in an injection molding machine, including an electric motor that produces axial advance movement of the screw via an appropriate gear train, and a piston that can be moved in a cylinder by pressure from a hydraulic fluid reservoir, wherein the movement of the piston can be used to supplement the axial movement created by the electric motor, characterized in that pressurization of the cylinder (13) by the hydraulic fluid reservoir (15) occurs upon reaching a defined control quantity that corresponds to a defined load condition on the electric motor (9) in which the pressure rise in cylinder (13) is proportional to the load of electric motor (9).

2. A drive according to claim 1, characterized in that the cylinder (12) having piston (11) can be connected to the hydraulic fluid reservoir (15) via at least one controllable hydraulic valve (14).

3. A drive according to claim 1 or 2, characterized in that the control quantity is measured directly on electric motor (9).

4. A drive according to claim 3, characterized in that torque of the electric motor (9) is the control quantity measured to produce a control signal.

5. A drive according to claim 3, characterized in that power consumption of electric motor (9) is the control quantity measured to produce a control signal.

6. A drive according to claim 1 or 2, characterized in that a feedback signal to control hydraulic fluid circulation is generated based on a comparison of actual advance speed of the screw (2), which is actual injection speed, with a reference speed.

7. A drive according to claim 1 or 2, characterized in that a feedback signal to control hydraulic fluid circulation is generated based on a comparison of actual melt pressure during a dwell pressure phase, with a reference pressure.

8. A drive according to claim 7, characterized in that the pressure feedback signals are produced by using a melt pressure measurement device.

9. A drive according to claim 7, characterized in that the pressure feedback signals are produced by a force measurement in a connection region (4) of the injection screw (2) and a translatory drive element (5).

10. A drive according to claim 1 or 2, characterized in that the hydraulic fluid reservoir (15) can be charged by a pump (16) driven by electric motor (9) in which a coupling system (8) is provided by which the electric motor (9) can be connected alternately to pump (16) or gear train (5, 6).

* * * * *